(12) United States Patent
Shinomiya

(10) Patent No.: US 6,928,529 B2
(45) Date of Patent: Aug. 9, 2005

(54) DATA TRANSFER BETWEEN VIRTUAL ADDRESSES

(75) Inventor: Kiyoshi Shinomiya, Tokyo (JP)

(73) Assignee: NEC Corporation, Tokyo (JP)

( * ) Notice: Subject to any disclaimer, the term of this patent is extended or adjusted under 35 U.S.C. 154(b) by 448 days.

(21) Appl. No.: 10/210,052

(22) Filed: Aug. 2, 2002

(65) Prior Publication Data

US 2003/0033431 A1 Feb. 13, 2003

(30) Foreign Application Priority Data

Aug. 7, 2001 (JP) ........................................ 2001-239590

(51) Int. Cl.[7] .......................... G06F 12/10; G06F 13/00
(52) U.S. Cl. ...................... 711/203; 711/154; 711/200; 711/206; 709/245
(58) Field of Search ................................ 711/118, 154, 711/203, 206, 207; 709/200, 213, 214, 217, 245

(56) References Cited

U.S. PATENT DOCUMENTS

| 5,522,045 | A | | 5/1996 | Sandberg |
| 5,666,514 | A | * | 9/1997 | Cheriton ..................... 711/144 |
| 5,893,155 | A | * | 4/1999 | Cheriton ..................... 711/144 |
| 6,425,058 | B1 | * | 7/2002 | Arimilli et al. ............. 711/134 |
| 6,769,052 | B2 | * | 7/2004 | Chauvel et al. ............. 711/154 |

FOREIGN PATENT DOCUMENTS

| JP | H05-89056 A | 4/1993 |
| JP | H05-181751 A | 7/1993 |
| JP | H06-19785 A | 1/1994 |
| JP | H08-241293 A | 9/1996 |
| JP | H10-275129 A | 10/1998 |
| JP | 2000-67009 A | 3/2000 |
| JP | 2000-330960 A | 11/2000 |

OTHER PUBLICATIONS

C. Maples, "A High–Performance, Memory–Based Interconnection System for Multicomputer Environments", *Proceedings of the Supercomputing Conference*, New York, Nove. 12–16, 1990, Washington, IEEE Comp. Soc. Press, US, vol. Conf. 3, Nov. 12, 1990, pp. 295–304.

Kano, Yasushi, and four others, "Parallel Computer Cenju–4 User Level Message Transmission Structure," Parallel Processing Symposium JSPP '99 Collected Papers, Japan, Information Processing Society of Japan Jun. 9, 1999, pp. 7–14.

(Continued)

*Primary Examiner*—Tuan V. Thai
(74) *Attorney, Agent, or Firm*—Sughrue Mion, PLLC

(57) ABSTRACT

When a first computer instructs transfer of data from the first computer to a second computer, a transmitting device in the first computer instructs the second computer to perform pre-read of a translation look-aside buffer, which contains a transfer-destination virtual address, in concurrence with read-out of initial data or of initial data for which the transfer-destination address has exceeded a page boundary, thereby causing virtual-address translation information to be pre-registered in a translation look-aside buffer from an address translation table of the second computer. When the second computer instructs transfer of data from the first computer to the second computer, a receiving device in the first computer instructs the second computer to perform pre-read of a translation look-aside buffer, which contains a transfer-destination virtual address, in concurrence with read-out of initial data or of initial data for which the transfer-destination address has exceeded a page boundary, thereby causing virtual-address translation information to be pre-registered in the translation look-aside buffer from an address translation table of the second computer.

11 Claims, 13 Drawing Sheets

OTHER PUBLICATIONS

Kunisawa, Ryōta, and two others, "A Performance Evaluation of Memory–Based Transmission Supported by Address Conversion Hardware," The Institute of Electronics, Information and Communication Engineers Research Report, Japan, The Institute of Electronics, Information and Communication Engineers Aug. 4, 1998, vol. 98, No. 233, (CPSY98–48–59), pp. 61–66.

Nakajo, Hironori, and three others, "A Performance Evaluation of a Non–Redundant Protocol in a Shared Virtual Memory System of Parallel Computers in a Combined Network and its Realization through Hardware," Parallel Processing Symposium JSPP '91 Collected Papers, Japan, Information Processing Society of Japan, May 1991, pp. 45–52.

Shimizu, Kentarō, "Basic Knowledge of Distributed Processing & Distributed OS," Interface, Japan, CQ Publishing KK, Oct. 1, 1991, vol. 17, No. 10, pp. 124–139.

Date, Shinya, and eight others, "A High–Speed Communications Structure to Realize a Computer Colony," The Institute of Electronics, Information and Communication Engineers Research Report, Japan, The Institute of Electronics, Information and Communication Engineers Aug. 4, 1999, vol. 99, No. 251, (CPSY99–47–61), pp. 41–48.

Matsuoka, Kōji, and seven others, "Memory Configuration in the RWC–1 Super Parallel Computer," Information Processing Society of Japan Research Report, Japan, Information Processing Society of Japan Aug. 19, 1993, vol. 93, No. 71, (93–ARC–101), pp. 17–24.

Kudo, Tomohiro, and four others, "An Evaluation of a Network Interface for Network–Based Parallel Computing," The Institute of Electronics, Information and Communication Engineers Research Report, Japan, The Institute of Electronics, Information and Communication Engineers Aug. 5, 1998, vol. 98, No. 234, (CPSY98–60–73), pp. 1–8.

Maples, Creve, "A High–Performance, Memory–Based Interconnection System for Multicomputer Environments," Proceedings of Supercomputing '90, IEEE, Nov. 12, 1990, pp.: 295–304.

* cited by examiner

FIG. 7

| | COMPUTER 1 | | COMPUTER 2 | |
|---|---|---|---|---|
| | CPU 100 | TRANSMITTING DEVICE 410 | RECEIVING DEVICE 420 | CPU 100 |
| SEQUENCE 1 | SET ADDRESS TRANSLATION TABLE | | | SET ADDRESS TRANSLATION TABLE |
| SEQUENCE 2 | REMOTE-WRITE INSTRUCTION | | | |
| SEQUENCE 3 | | TRANSFER TLB READ-OUT PACKET WHICH CONTAINS TRANSFER-DESTINATION VIRTUAL ADDRESS AS VIRTUAL ADDRESS, TO COMPUTER 2 | | |
| SEQUENCE 4 | | INDEX TLB BY TRANSFER-ORIGIN VIRTUAL ADDRESS AND TRANSLATE THIS ADDRESS TO TRANSFER-SOURCE REAL ADDRESS | INDEX TLB BY VIRTUAL ADDRESS IN TLB PRE-READ PACKET AND TRANSLATE THIS ADDRESS TO REAL ADDRESS | |
| SEQUENCE 5 | | IN CASE OF TLB MISS, TRANSLATE TO TRANSFER-SOURCE REAL ADDRESS USING ADDRESS TRANSLATION TABLE 500 | IN CASE OF TLB MISS, TRANSLATE TO REAL ADDRESS USING ADDRESS TRANSLATION TABLE 500 | |
| SEQUENCE 6 | | READ IN WRITE DATA FROM TRANSFER-SOURCE REAL ADDRESS OF MAIN MEMORY 300 | | |
| SEQUENCE 7 | | TRANSFER WRITE PACKET, WHICH CONTAINS WRITE DATA AND TRANSFER-DESTINATION VIRTUAL ADDRESS, TO COMPUTER 2 | | |
| SEQUENCE 8 | | | INDEX TLB BY TRANSFER-DESTINATION VIRTUAL ADDRESS IN WRITE PACKET AND TRANSLATE THIS ADDRESS TO TRANSFER-DESTINATION REAL ADDRESS | |
| SEQUENCE 9 | | | IN CASE OF TLB MISS, TRANSLATE TO TRANSFER-DESTINATION REAL ADDRESS USING ADDRESS TRANSLATION TABLE 500 | |
| SEQUENCE 10 | | | WRITE IN WRITE DATA TO TRANSFER-DESTINATION REAL ADDRESS OF MAIN MEMORY 300 | |

FIG. 8a
REMOTE-WRITE PACKET

| | | |
|---|---|---|
| INSTRUCTION ITEM | INSTRUCTION (WRITE) | DATA LENGTH = 4 |
| HOST ITEM | TRANSMIT/RECEIVE COMPUTER NO. | |
| ADDRESS ITEM | TRANSFER-DESTINATION VIRTUAL ADDRESS | |
| DATA ITEM | TRANSFER DATA | |
| DATA ITEM | | |
| DATA ITEM | | |
| DATA ITEM | | |

↕ DATA LENGTH

FIG. 8b
REMOTE-READ PACKET

| | | |
|---|---|---|
| INSTRUCTION ITEM | INSTRUCTION (READ) | DATA LENGTH = 1 |
| HOST ITEM | TRANSMIT/RECEIVE COMPUTER NO. | |
| ADDRESS ITEM | TRANSFER-SOURCE VIRTUAL ADDRESS | |
| DATA ITEM | TRANSFER-DESTINATION VIRTUAL ADDRESS | |

↕ DATA LENGTH

FIG. 8c
TLB PRE-READ PACKET

| | | |
|---|---|---|
| INSTRUCTION ITEM | INSTRUCTION (TLB) | DATA LENGTH = 0 |
| HOST ITEM | TRANSMIT/RECEIVE COMPUTER NO. | |
| ADDRESS ITEM | VIRTUAL ADDRESS | |

FIG. 8d
INSTRUCTION-TYPE LIST

| INSTRUCTION TYPE | DESCRIPTION |
|---|---|
| Write | REMOTE WRITE: RECEIVING DEVICE WRITES DATA TO TRANSFER-DESTINATION VIRTUAL ADDRESS |
| Read | REMOTE READ: RECEIVING DEVICE READS OUT DATA OF TRANSFER-SOURCE VIRTUAL ADDRESS, SETS TRANSFER-DESTINATION VIRTUAL ADDRESS IN WRITE PACKET AND TRANSFERS TO TRANSMITTED DEVICE AT TRANSMITTING SOURCE |
| TLB | TLB INDEXED BY VIRTUAL ADDRESS; REAL ADDRESS BASE READ OUT OF ADDRESS TRANSLATION TABLE AND REGISTERED IN CASE OF TLB MISS |

FIG. 8e
REMOTE-READ PACKET

| | | | |
|---|---|---|---|
| INSTRUCTION ITEM | INSTRUCTION (READ) | DATA LENGTH = 1 | PF |
| HOST ITEM | TRANSMIT/RECEIVE HOST NO. | | |
| ADDRESS ITEM | TRANSFER-SOURCE VIRTUAL ADDRESS | | |
| DATA ITEM | TRANSFER-DESTINATION VIRTUAL ADDRESS | | |

↕ DATA LENGTH

*PF: TLB PRE-READ DESIGNATING FLAG

FIG. 9

| | COMPUTER 1 | | | COMPUTER 2 | |
|---|---|---|---|---|---|
| | CPU100 | TRANSMITTING DEVICE 410 | RECEIVING DEVICE 420 | RECEIVING DEVICE 420 | CPU100 |
| SEQUENCE 1 | SET ADDRESS TRANSLATION TABLE | | | | SET ADDRESS TRANSLATION TABLE |
| SEQUENCE 2 | REMOTE-WRITE INSTRUCTION | | | | |
| SEQUENCE 3 | | TRANSFER READ PACKET, WHICH CONTAINS TRANSFER-SOURCE VIRTUAL ADDRESS AND TRANSFER-DESTINATION VIRTUAL ADDRESS, TO COMPUTER 2 | | | |
| SEQUENCE 4 | | | | TRANSFER TLB PRE-READ PACKET WHICH CONTAINS TRANSFER-DESTINATION VIRTUAL ADDRESS IN READ PACKET AS VIRTUAL ADDRESS, TO COMPUTER 1 | |
| SEQUENCE 5 | | | INDEX TLB BY VIRTUAL ADDRESS IN TLB PRE-READ PACKET AND TRANSLATE THIS ADDRESS TO REAL ADDRESS | INDEX TLB BY TRANSFER-ORIGIN VIRTUAL ADDRESS IN READPACK AND TRANSLATE THIS ADDRESS TO TRANSFER-SOURCE REAL ADDRESS | |
| SEQUENCE 6 | | | IN CASE OF TLB MISS, TRANSLATE TO REAL ADDRESS USING ADDRESS TRANSLATION TABLE 500 | IN CASE OF TLB MISS, TRANSLATE TO TRANSFER-SOURCE REAL ADDRESS USING ADDRESS TRANSLATION TABLE 500 | |
| SEQUENCE 7 | | | | READ READ-OUT DATA OUT OF TRANSFER-SOURCE REAL ADDRESS OF MAIN MEMORY 300 | |
| SEQUENCE 8 | | | | TRANSFER WRITE PACKET, WHICH CONTAINS READ-OUT DATA AND TRANSFER-DESTINATION VIRTUAL ADDRESS IN READ PACKET, TO COMPUTER 1 | |
| SEQUENCE 9 | | | INDEX TLB BY TRANSFER-DESTINATION VIRTUAL ADDRESS IN WRITE PACKET AND TRANSLATE THIS ADDRESS TO TRANSFER-DESTINATION REAL ADDRESS | | |
| SEQUENCE 10 | | | IN CASE OF TLB MISS, TRANSLATE TO TRANSFER DESTINATION REAL ADDRESS USING ADDRESS TRANSLATION TABLE 500 | | |
| SEQUENCE 11 | | | WRITE READ-OUT DATA TO TRANSFER-DESTINATION REAL ADDRESS OF MAIN MEMORY 300 | | |

DATA TRANSFER BETWEEN VIRTUAL ADDRESSES

FIELD OF THE INVENTION

This invention relates to a system for data transfer between virtual addresses, the system having a plurality of computers that transfer data between each other by designating addresses of a data-transfer source and data-transfer destination through use of virtual addresses. More particularly, the invention relates to a virtual-address data transfer system in which a transmitting device and a receiving device in each of a plurality of computers have a TLB (Translation Look-aside Buffer) that holds a portion of translation information, which is for translating virtual addresses to real addresses, wherein a translation from a virtual address to a real address is performed using the translation information held in the TLB.

BACKGROUND OF THE INVENTION

Computer systems are often required to execute processing that exceeds the processing capability of a single processor. In addition, enhancement of processing capability required of a computer system tends to exceed enhancement of the capabilities possessed by a single processor.

For this reason, a memory-sharing multiprocessor which uses a plurality of CPUs that share memory space are coming into wider use in computer systems.

However, a memory-sharing multiprocessor is such that when it is attempted to maintain so-called cache coherence, namely the coherence between caches for the purpose of improving memory access performance processors, there are instances where other capabilities suffer. This tendency is particularly pronounced in large-scale multiprocessors. Accordingly, a first problem that arises in a memory-sharing multiprocessor is that the number of processors that share memory space cannot be increased without limit.

In order to solve this first problem, use is made of a multi-computer system in which a plurality of computers are interconnected by a switched network in the form of a large-scale numerical arithmetic unit used in research applications, etc., thereby making it unnecessary for memory space to be shared by these computers. There are increasing opportunities to utilize multi-computer systems, which are obtained by such networking of multiple computers that do not guarantee cache coherence, even in ordinary computer systems.

In such a multi-computer system, however, it is necessary for data that has been processed by each of the plurality of computers to be transferred to another computer. When the amount of data increases, therefore, a second problem which arises is an increase in the time expended in the data processing processors for the purpose of transferring data between computers, as a result of which the overall processing capability of the multi-computer system declines.

In order to solve the second problem, a system has been developed in which a transfer device dedicated solely to data transfer is incorporated in each computer of the multi-computer system and data transfer is performed by the transfer device in units larger than the data size processed at one time by the processor. This improves transfer capability, shortens the time needed by the processor to perform the data transfer and enhances the overall performance of a multiple-host apparatus.

Though operating systems have been started out by being small and simple, recent operating systems, however, are large in scale and of great complexity. A third problem, which relates to a switching from a user process to an operating-system process (OS process), is that it is not possible to ignore the overhead of context switches for making this transition between processes when relying upon the above-described data transfer.

In order to solve the third problem, a system has been developed in which transfer-source/transfer-destination addresses at the time of data transfer are specified by virtual addresses in the address space of the user process, with a virtual address being translated to a real address by the above-mentioned transfer device.

In accordance with this system, the need to rely upon the operating system to translate a virtual address to a real address whenever a data transfer is designated can be eliminated, as a result of which it is possible to reduce the frequency of context switching.

The transfer device has an address translation function that holds translation information which is for translating a virtual address to a physical address. However, since the overall translation information of virtual addresses is very large, a fourth problem which arises is that it is difficult for the transfer device to be equipped internally with an address translation table that holds the entirety of the translation information relating to the virtual addresses.

In order to solve the fourth problem, a method in wide use places the address translation table, which holds the entirety of the translation information of the virtual addresses, external to the transfer device, and internally provides the transfer device with a small address translation table, i.e., a TLB (Translation Look-aside Buffer), that holds only the translation information from the address translation table that corresponds to some of the virtual addresses used most recently.

SUMMARY OF THE DISCLOSURE

However, the system that employs the TLB is such that if the TLB does not hold the translation information relating to a required virtual address, i.e., if a TLB miss occurs, then it becomes necessary to read the required translation information from the address table that is arranged outside the transfer device. Since the read-out speed in such case is slow, however, high-speed address translations cannot be performed. Accordingly, a fifth problem is that performance declines when TLB misses occur.

Furthermore, the possibility that a TLB miss will occur rises when data transfer starts or when the boundary of a page, which is the unit of virtual address management, is exceeded. A sixth problem, therefore, is that performance declines when a function for data transfer between virtual addresses is used.

In order to solve the sixth problem, there is need of a system in which the ability to achieve transfer between virtual addresses for carrying out a transfer of data using virtual addresses is made equivalent to the ability to achieve transfer between real addresses for carrying out a transfer of data using real addresses.

Accordingly, it is an object of the present invention is to solve the fifth and sixth problems described above.

Another object of the present invention is to provide a system for data transfer between virtual addresses in which a request to pre-read address translation information is transmitted in advance before transfer data arrives at a data receiving device, thereby concealing the time required for address translation in the data read-out time of a data transmitter, executing the address translation at a high apparent speed and shorting the time needed for data transfer, and in which the possibility that a TLB miss will occur at the start of data transfer or when a page boundary is exceeded is reduced.

In accordance with an aspect of the present invention, the foregoing objects are attained by providing a system for transferring data between virtual addresses, the system comprising a plurality of computers each equipped with a central processing unit; a main memory for storing data; an address translation table holding address information for translating a virtual address to a real address; a transmitting device for reading out, and transmitting to a switched network, data from the main memory, the transmitting device incorporating a TLB holding a portion of the translation information of the address translation table; and a receiving device for receiving, and writing to the main memory, data from the switched network, the receiving device incorporating a TLB holding a portion of the translation information of the address translation table; the data in the main memories being transferred between the plurality of computers via the switched network by designating addresses of a data-transfer source and data-transfer destination by the virtual addresses, translation information corresponding to the virtual addresses of the data-transfer source and data-transfer destination being registered in the TLBs from the address translation table internally of the transmitting and receiving devices within the computers, and an address translation from the virtual addresses to the real addresses being performed using the translation information registered in the TLBs; wherein if data in the main memory of a computer equipped with the transmitting device is transmitted to the receiving device within another computer, the transmitting device, in concurrence with the reading out of data from the main memory within the computer equipped with this transmitting device, instructs the receiving device within the other computer to pre-register the translation information corresponding to the virtual address of the data-transfer destination in the TLB within this other computer.

In accordance with another aspect of the present invention, upon receiving, from the transmitting device of another computer constituting a requesting source, a remote-read instruction to transfer data from the main memory of its own computer to the main memory within this computer constituting the requesting source, the receiving device, in concurrence with the reading out of data from the main memory of its own computer, instructs the receiving device within the computer constituting the requesting source to pre-register the translation information corresponding to the virtual address of the destination-transfer destination in the TLB within the computer constituting the requesting source.

In accordance with a further aspect of the present invention, the transmitting device and the receiving device perform the address translation on a per-page basis, where a page is the size of a predetermined memory space in the main memory.

In accordance with a further aspect of the present invention, if data in the main memory of a computer equipped with the transmitting device is transmitted to the receiving device within another computer, the transmitting device instructs the receiving device within the other computer to pre-register the translation information in the TLB when data transmission starts and instructs the receiving device within this other computer to register the translation information in the TLB when a virtual address in the main memory within this other computer causes a page boundary to be exceeded.

In accordance with a further aspect of the present invention, upon receiving, from the transmitting device of another computer constituting a requesting source, a remote-read instruction to transfer data from the main memory of its own computer to the main memory within the computer constituting the requesting source, the receiving device instructs the receiving device within the computer constituting the requesting source to pre-register the translation information in the TLB when a virtual address of the computer constituting the requesting source exceeds a page boundary.

In accordance with a further aspect of the present invention, when the transmitting device instructs that the translation information is to be pre-registered in the TLB, the transmitting device does so by providing a dedicated line between computers or by transmitting a TLB pre-read packet, which contains the virtual address of the data-transfer destination, to the receiving device via the switched network.

In accordance with a further aspect of the present invention, when the receiving device instructs that the translation information is to be pre-registered in the TLB, the receiving device does so by providing a dedicated line between computers or by transmitting a TLB pre-read packet, which contains the virtual address of the data-transfer destination, to the receiving device within the computer constituting the requesting source via the switched network.

In accordance with the present invention, when the transmitting device within a computer that is the source of a data transmission transmits data to the receiving device within the computer that is the destination of the data transmission, the transmitting device, in concurrence with read-out of data from the main memory within the computer that is the source of the data transmission, instructs the receiving device within the computer that is the destination of the data transmission to pre-register translation information that corresponds to the virtual address of the data-transfer destination in the TLB. As a result, the read-out of data from the main memory in the computer that is the source of the data transmission is performed in concurrence with the read-out of translation information from the address translation table to the TLB in the computer that is the destination of the data transmission. Consequently, read-out from the address translation table for address translation in the data receiving device is concealed in the data read-out time of the data transmitting device. This shortens apparent address translation time and, hence, the overall time required for data transfer.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 7 is a diagram useful in describing a remote-write operation in the system for transferring data between virtual addresses shown in FIG. 1;

FIGS. 8a to 8e are diagrams useful in describing the packet formats of packets used in the system for transferring data between virtual addresses according to the present invention, in which FIG. 8a is a diagram illustrating the packet format of a remote-write packet, FIG. 8b is a diagram illustrating the packet format of a remote-read packet, FIG. 8c is a diagram illustrating the packet format of a TLB pre-read packet, FIG. 8d is a diagram illustrating the operations relating to instructions based upon the packets indicated at FIG. 8a through FIG. 8c, and FIG. 8e is a diagram illustrating a remote-read packet with a pre-read designating flag;

FIG. 9 is a diagram useful in describing a remote-read operation in the system for transferring data between virtual addresses shown in FIG. 1;

PREFERRED EMBODIMENTS OF THE INVENTION

Preferred embodiments of the present invention will now be described with reference to the accompanying drawings.

Figure 1:
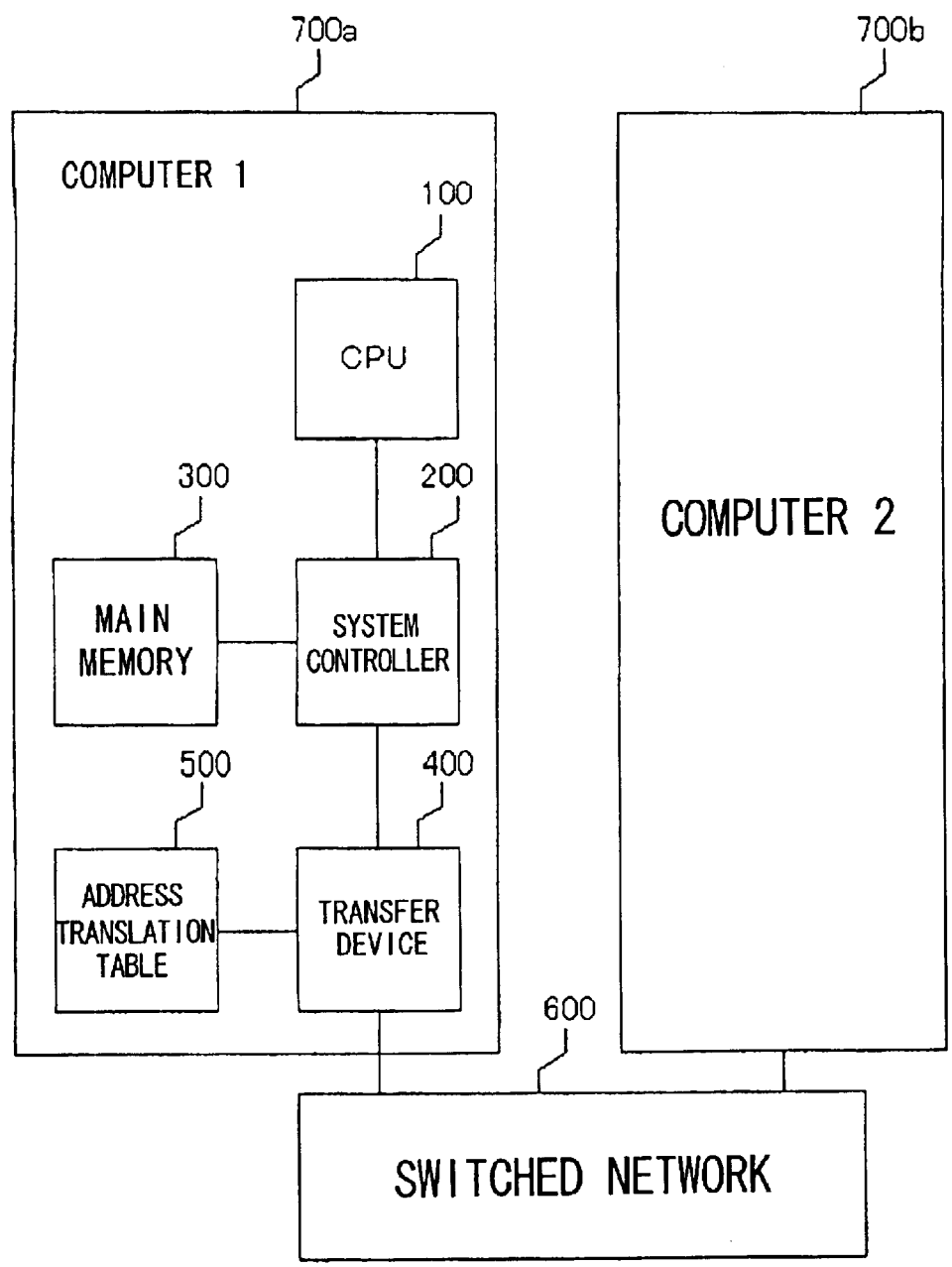
FIG. 1 is a block diagram illustrating a first embodiment of a system for transferring data between virtual addresses according to the present invention.

FIG. 1 is a diagram illustrating a system for transferring data between virtual addresses in accordance with a first embodiment of the present invention.

In the first embodiment, as shown in FIG. 1, computers 700a and 700b (termed also as "computer 1" and "computer 2", respectively, below) that exchange data with each other via a switched network 600 are provided.

The internal structure of the computer 700a will now be described. The internal structure of the computer 700b is identical with that of the computer 700a, though this is not shown in FIG. 1.

The computer 700a comprises a CPU 100, which is a central processing unit for processing various instructions; a main memory 300 for holding various instructions and data; a transfer device 400 for sending data to and receiving data from the other computer 700b via the switched network 600; a system controller 200, which is connected to the CPU 100, main memory 300 and transfer device 400, for writing data to and reading data from the main memory 300; and an address translation table 500, which is connected to the transfer device 400, for holding real address bases 511 (see FIGS. 3 and 4) as translation information for translating logical addresses (virtual addresses) of a data-transfer source and data-transfer destination to physical addresses (real addresses).

Figure 2:
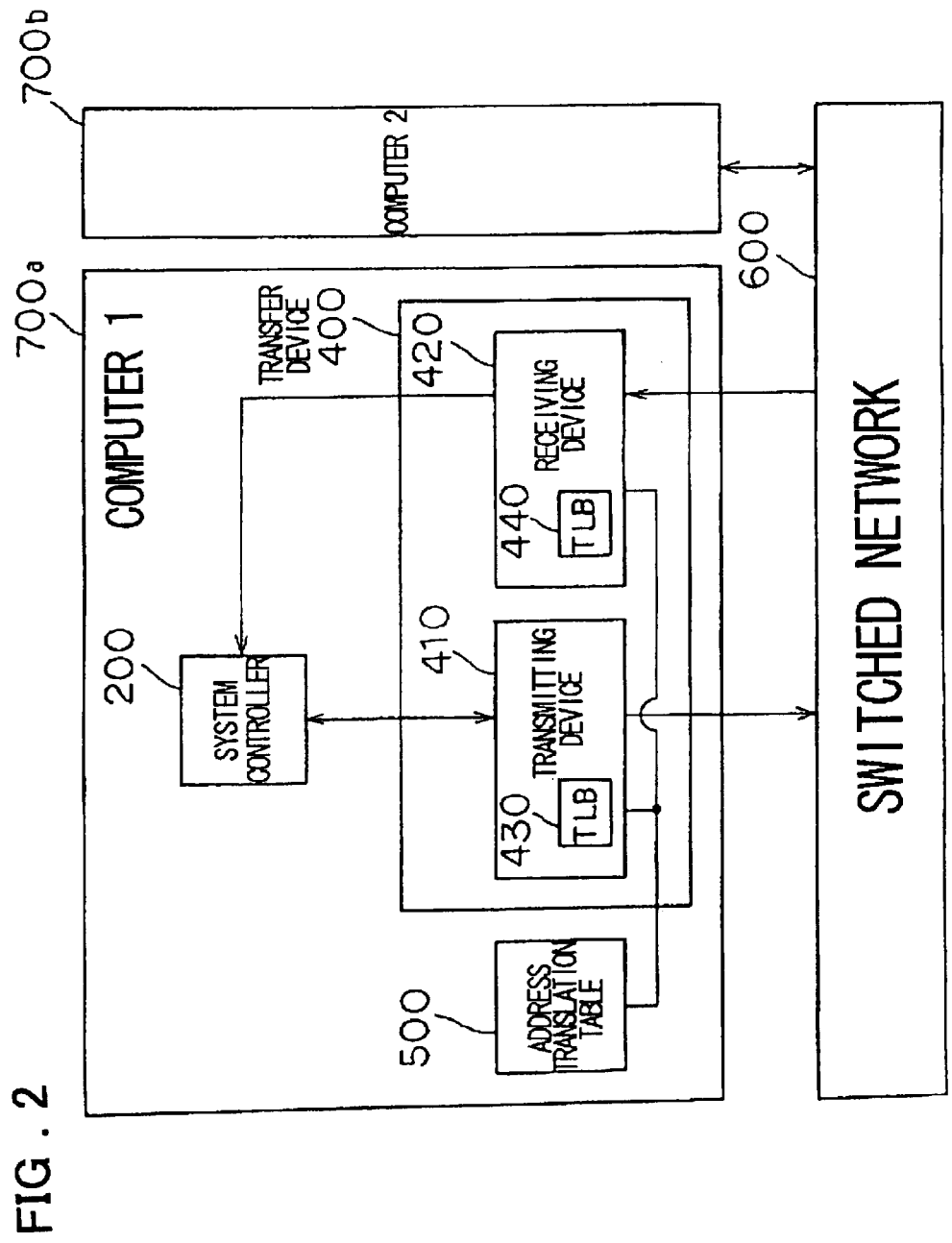
FIG. 2 is a block diagram useful in describing the structure of a transfer device shown in FIG. 1.

The structure of the transfer device 400 will be described with reference to FIG. 2.

The transfer device 400 comprises a transmitting device 410 for transmitting data to the other computer 700b via the switched network 600, and a receiving device 420 for receiving data transmitted from the other computer 700b via the switched network 600.

The transmitting device 410 and receiving device 420 incorporate address translating buffers TLB 430 and TLB 440, respectively. The buffers TLBs 430 and 440 hold some of the most recently used address translation table entries, which are from the address translation table entries within the address translation table 500, as TLB entries together with virtual address bases, which are portions of the virtual addresses used in an address translation. Here TLB, which is a small-capacity buffer for address translation, stands for Translation Look-aside Buffer. From this point onward, TLB will be used to indicate an address translation buffer.

Figure 3:
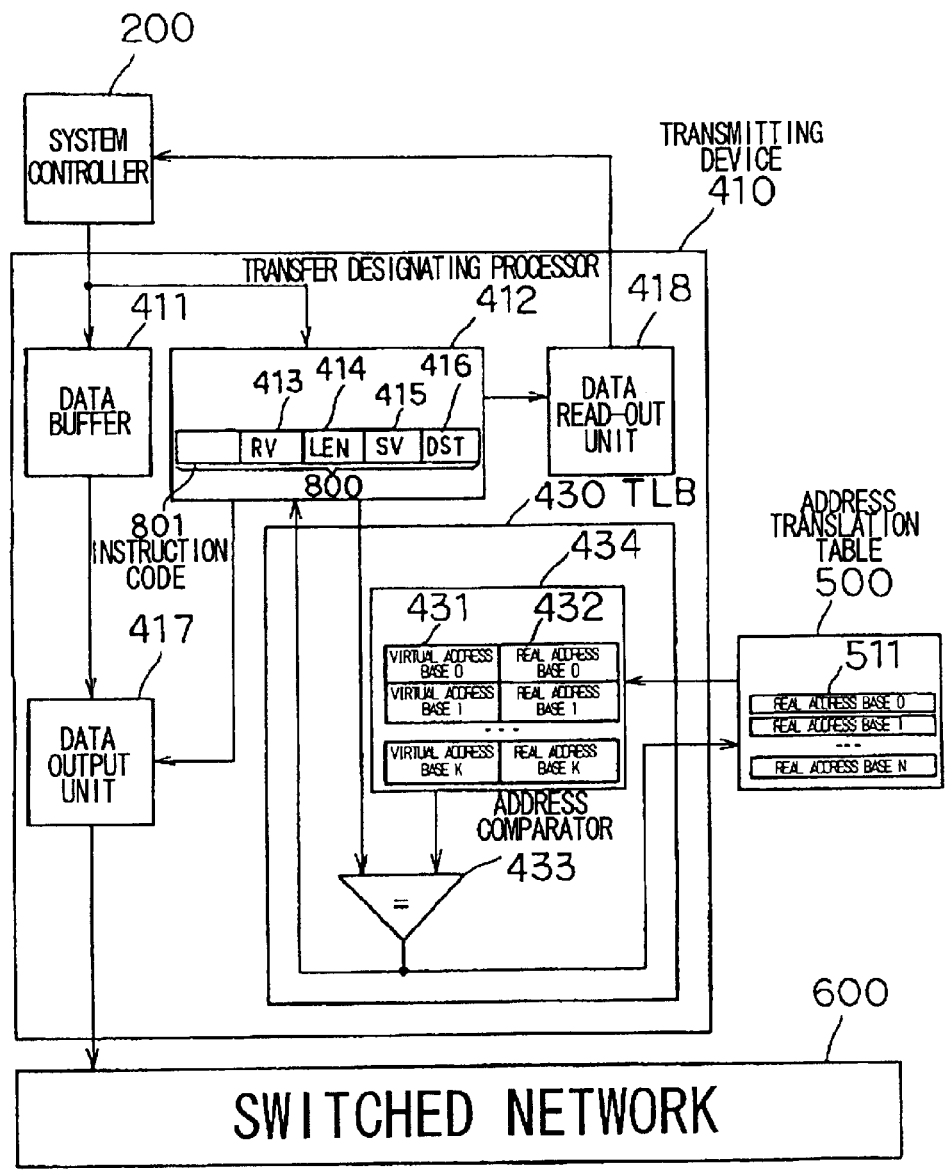
FIG. 3 is a diagram useful in describing the structure of a transmitting device shown in FIG. 2.

The structure of the transmitting device 410 in the transfer device 400 will be described with reference to FIG. 3.

The transmitting device 410 includes a data buffer 411 for storing data from the main memory 300 via the system controller 200; a transfer command processing unit 412 for storing a transfer command from the CPU 100 via the system controller 200; the address translating buffer TLB 430 for translating a transfer-source address, which has been designated by the virtual address of a user process, to a real address, which is an address in the main memory 300; and an address comparator 433, which is provided in the TLB 430, for comparing a virtual address from the transfer command processing unit 412 with a virtual address base 431 of each entry in the TLB. The address comparator 433 generates a real address from a real address base 432 and sends the real address back to the transfer command processing unit 412 if the compared addresses match. If the compared addresses do not match, the address comparator 433 reads out a corresponding real address base in the address translation table 500, registers a virtual address received from the transfer command processing unit 412 and a real address base 511, which has been read out of the address translation table 500, in the TLB as a set of TLB entry, generates a real address from the real address base 432 of a TLB entry having the virtual address base 431 for which a match has been obtained after again indexing the TLB, and sends the generated real address back to the transfer command processing unit 412. The transmitting device 410 further includes a data read-out unit 418 for issuing a read-out request via the system controller 200 to read out data in the main memory 300 at the real address designated from the transfer command processing unit 412; and a data output unit 417 for generating a packet from a command from the transfer command processing unit 412 and data received from the data buffer 411, and outputs the packet to the switched network 600.

The data buffer 411 receives data, which has been read out of the main memory 300, via the system controller 200, holds this data temporarily and transfers the read data to the data output unit 417.

The transfer command processing unit 412 receives a transfer command from the CPU 100 via the system controller 200 and holds this transfer command in an instruction 800. The instruction 800 consists of an instruction code 801, a transfer-destination virtual address (RV) 413, a transfer count 414 (LEN), a transfer-source virtual address (SV) 415, and a destination computer number (DST) 416. In accordance with the instruction 800, the transfer command processing unit 412 instructs the data output unit 417 to generate a transfer packet and to output the packet to the switched network 600.

Further, until data of a predetermined data length is transferred a number of times specified by the transfer count 414, the transfer command processing unit 412 re-calculates the transfer-destination virtual address 413 and transfer-source virtual address 415 whenever one packet of data is transferred. It should be noted that the re-calculation of the transfer-destination virtual address 413 and transfer-source virtual address 415 is performed based upon a predetermined data transfer length of one packet. For example, if one data-transmission length is 64 bytes, then a new virtual address is calculated according to the following formula:

a new virtual address=old virtual address+64.

In order to translate the transfer-source virtual address 415 within the transfer command processing unit 412 to a real address, the TLB 430 holds, as a single TLB entry, an address translation table entry that is part of the real address base 511 serving as the address translation table entry in the address translation table 500, and a virtual address base that is part of the virtual address used when reading the real address base 432 serving as the address translation table entry. Each TLB entry is held as virtual address base 431, which is part of a virtual address, and real address base 432, which is part of a real address.

The address comparator 433 compares the virtual address bases 431 of TLB 430 with the virtual address base that is part of the transfer-source virtual address 415, and discriminates TLB hit/miss based upon the result of the comparison. If a TLB entry that matches a virtual address base that is part of the transfer-source virtual address 415 has been registered in the virtual address base 431, then this is determined to indicate a TLB hit. If such a TLB entry has not been registered, then this is determined to indicate a TLB miss.

If the address comparator 433 has determined that a TLB hit occurred, then the data read-out unit 418 generates a real address from the real address base 432 of the TLB 430 and an offset that is part of the transfer-source virtual address 415, and requests the system controller 200 to read data out of the main memory 300 from this generated real address.

In accordance with the instruction 800 accepted by the transfer command processing unit 412, the data output unit 417 generates a remote-write packet, a remote-read packet and a TLB pre-read packet using data, which is transferred from the data buffer 411 to the data output unit 417, and the instruction code 801, transfer-destination virtual address 413, transfer-source virtual address 415 and destination computer number 416 contained in the transfer command processing unit 412, and transmits these packets to the switched network 600. A detailed description of the remote-write packet, remote-read packet and TLB pre-read packet will be rendered later.

The address translation table 500 will be described with reference to FIG. 3.

The address translation table 500 is composed of a plurality of address translation table entries, which hold the real address bases 511. The plurality of real address bases 511 have real address base numbers. A real address base is read out using, as the real address base number, a virtual address base in a real address base read-out request from the transmitting device 410 or receiving device 420, and the real address base read out is sent back.

Figure 4:
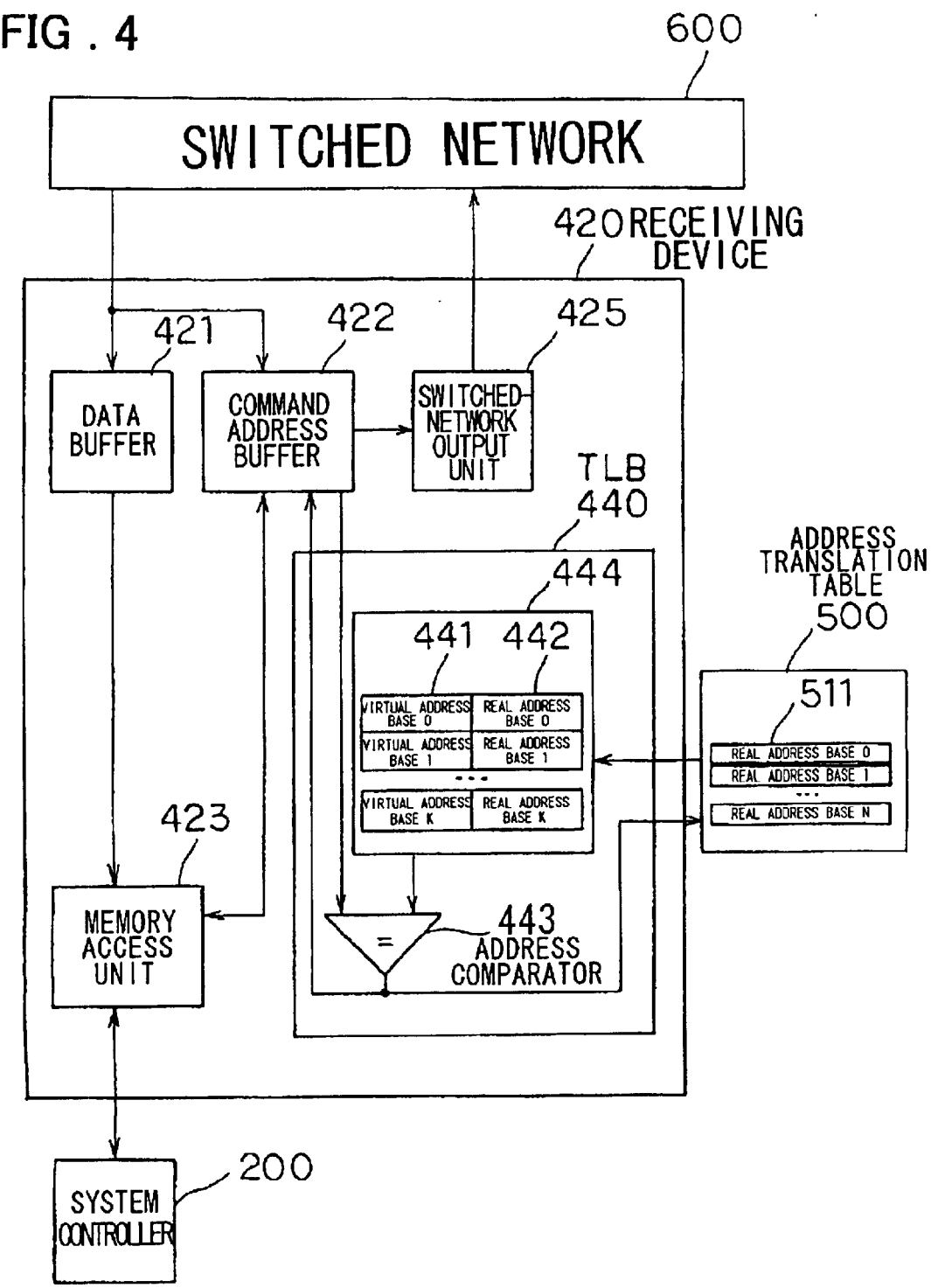
FIG. 4 is a block diagram useful in describing the structure of a receiving device shown in FIG. 2.

The structure of the receiving device 420 in transfer device 400 will be described with reference to FIG. 4.

The receiving device 420 includes a data buffer 421 for storing data contained in a packet transferred from the switched network 600, a command address buffer 422, a switched network output unit 425, a memory access unit 423 and a TLB 440. The command address buffer 422 receives the portion of the transferred packet that is other than data. If the content of an instruction item in the received packet is a remote-write instruction, the command address buffer 422 translates the virtual address of the destination to a real address using the TLB 440 and instructs the system controller 200 via a memory access unit 423 to write the data received from the switched network 600 to the main memory 300 at the real address obtained by the translation. If the content of an instruction item in the received packet is a remote-read instruction, the command address buffer 422 instructs the memory access unit 423 to read data out of the main memory 300 via the system controller 200 and instructs the memory access unit 423 to transfer the read data to the switched network 600 via a switched-network output unit 425. If the instruction item in the received packet is a TLB pre-read, then the command address buffer 422 instructs the TLB 440 to translate the destination virtual address in the received packet to a real address and instructs the TLB 440 to pre-register the TLB entry for the purpose of translating the virtual address to a real address. In accordance with a command from the command address buffer 422, the memory access unit 423 writes the data from the data buffer 421 to the main memory 300 via the system controller 200 or reads the data output of the main memory 300 via the system controller 200 and sends the read data back to the command address buffer 422. The switched-network output unit 425 outputs the packet to the switched network 600 in response to a command from the command address buffer 422. The TLB 440 translates the virtual address to a real address in response to a command from the command address buffer 422.

The TLB 440 includes an address comparator 443 which, in response to a command from the command address buffer 422, searches the TLB entries and generates a real address using a real address base 442 in the TLB if a hit is found. In case of a TLB miss, on the other hand, the comparator 443 generates a real address by a real address base read out of the address translation table 500 and sends the generated real address back to the command address buffer 422. The TLB 440 further includes a TLB entry array 444, in which a virtual address base 441 and the real address base 442 form a single TLB entry, for holding a plurality of TLB entries or a single TLB entry.

The data buffer 421 receives data transmitted from the other computer 700b via the switched network 600, holds this data temporarily and transfers the receive data to the memory access unit 423.

The TLB 440 holds some of the entries of the address translation table 500 in order to translate a transfer-destination virtual address, which has been received by the command address buffer 422, to a real address. Each entry is held as a virtual address base 441, which is part of a virtual address, and a real address base 442, which is part of a real address.

The address comparator 443 compares the virtual address bases 441 of TLB 440 with a virtual address base that is part of the transfer-destination virtual address received by the command address buffer 422 and discriminates TLB hit/miss based upon the result of the comparison. If an entry that matches a virtual address base that is part of the transfer-destination virtual address received by the command address buffer 422 exists among the virtual address bases 441, then this is deemed to indicate a hit. If such an entry does not exist, this is deemed to indicate a miss.

If the address comparator 443 has discriminated a TLB hit, the memory access unit 423 generates a real address from the real address base 442 of the TLB 440 and an offset that is part of the transfer-destination virtual address received by the command address buffer 422, and requests the system controller 200 to write data to the main memory 300 at the real address thereof.

Using the transfer-destination virtual address received by the command address buffer 422, the switched-network output unit 425 generates a remote-write packet and a TLB pre-read packet and transmits these to the switched network 600. A detailed description of the remote-write packet and a TLB pre-read packet will be rendered later.

Figure 5:
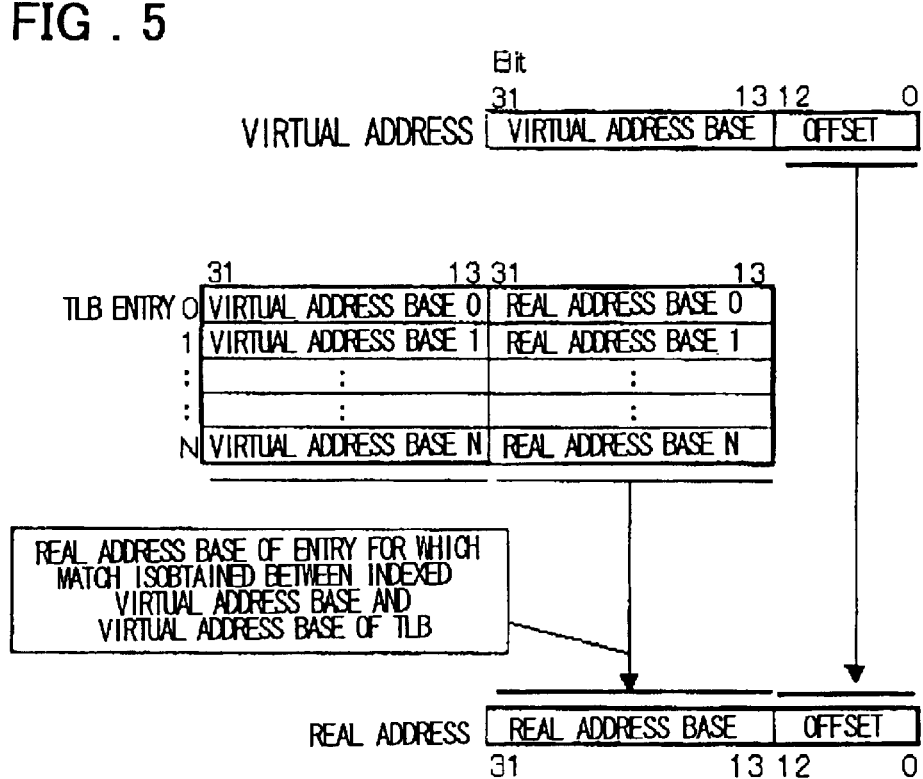
FIG. 5 is a diagram useful in describing an address translation operation, which uses a TLB, in the system for transferring data between virtual addresses shown in FIG. 1.

Reference will be had to FIG. 5 to describe an address translation operation for translating a virtual address to a real address according to this embodiment.

When a virtual address is translated to a real address, the TLB 430 and TLB 440 incorporated in the transmitting device 410 and receiving device 420, respectively, are used.

The TLBs 430 and 440 possess TLB entry arrays 434 and 444, respectively, and hold a plurality of TLB entries or a single TLB entry as virtual address bases 431 and 441 and real address bases 432 and 442.

In FIG. 5, a virtual address is composed of a 19-bit virtual address base from bit 31 to bit 13 and a 13-bit offset from bit 12 to bit 0. The number of bits, however, is for descriptive purposes only and any numbers of bits can be used for the virtual address base and its offset and for the total number of bits of the virtual address.

At the time of TLB indexing, virtual address bases 0 to N of all TLB entries and the virtual address base of a virtual address to undergo translation to a real address are compared. If a TLB entry that matches a virtual address base of the virtual address to undergo translation exists among any of the virtual address bases 0 to N, this is deemed to indicate a TLB hit. If such a TLB entry does not exist, this is deemed to indicate a TLB miss.

In case of a TLB hit, the real address base in the TLB entry for which the match was obtained is adopted as the real address base of a real address after translation. The offset composed of the lower 13 bits of the virtual address to undergo translation is combined with the above-mentioned real address base without being translated. The result is adopted as the real address after translation.

In case of a TLB miss, an address translation table entry is read from the address translation table entries in the address translation table 500 using the value of the virtual address base of the virtual address to undergo translation as the number of the real address base, the real address base 511 of the address translation table entry read out is registered as TLB entries in the TLBs 430 and 440, and then the TLBs 430 and 440 are indexed again to perform the above-mentioned address translation. The second address translation of the address following the TLB entry registration will always result in a TLB hit because entry registration will have been completed.

Figure 6:
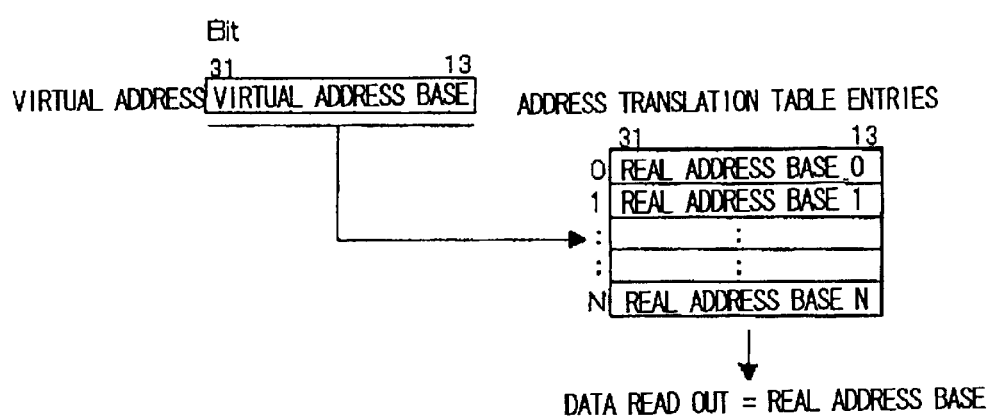
FIG. 6 is a diagram useful in describing an operation for reading an address translation table in the system for transferring data between virtual addresses shown in FIG. 1.

Next, reference will be had to FIG. 6 to describe an operation for registering an address translation table entry of the address translation table 500 as TLB entries of the TLBs 430 and 440.

Address translation table entries (real address bases 0 to N in FIG. 6) in the address translation table 500 are indexed using the virtual address base of the virtual address to be translated as the number of a real address base, and a real address base 511 corresponding to this virtual address base is read out.

Next, a TLB entry is selected from the TLB entries of the TLBs 430 and 440 through a predetermined procedure such as the LRU (Least Recently Used) method, and the real address base that was read out and the virtual address base that was used in reading out this real address base are registered as a single TLB entry with regard to the above-mentioned selected TLB entry. The values of the TLBs 430 and 440 are updated by this TLB entry registration operation.

Several methods can be used to select TLB entries. These include random selection, the above-mentioned LRU method or the round-robin method.

The address translation table 500 is updated via a certain path (not shown) when initialization is performed by the user process that employs the transfer device 400.

The remote-write operation for writing data from the local computer to another computer will be described with reference to FIG. 7.

FIG. 7 is a diagram illustrating the remote-write operation for a case where the data of computer 1 is written to computer 2.

First, the CPU 100 of computer 1 and the CPU 100 of computer 2 set the real address bases 511, which are located within the address translation table 500 and are necessary for the address translation of each process that instructs a data transfer, in the address translation table 500 of in each of computers 1 and 2 (Sequence 1).

Next, with respect to the transmitting device 410, the CPU 100 of computer 1 sets a remote-write instruction as the instruction code 801, transfer-source virtual address 415, transfer-destination virtual address 413, data-transfer length 414 and destination computer number 416 in instruction 800 within the transfer command processing unit 412 (Sequence 2).

Next, the transmitting device 410 of computer 1 generates a TLB pre-read packet that includes the transfer-destination virtual address, which was set in Sequence 2, as the virtual address, and transfers this packet to the receiving device 420 of computer 2, thereby requesting the receiving device 420 of computer 2 to perform TLB pre-read (Sequence 3).

Next, the transmitting device 410 of computer 1 translates the transfer-source virtual address, which was set in Sequence 2, to a transfer-source real address using the TLB 430 (Sequence 4).

Further, in Sequence 4, the receiving device 420 of computer 2 receives the TLB pre-read packet transferred from the transmitting device 410 of computer 1 at Sequence 3, indexes the TLB 440 by the virtual address within the TLB pre-read packet and translates the virtual address to a real address.

In a case where the TLB indexing in Sequence 4 is a TLB miss, the transmitting device 410 of computer 1 reads a real address base corresponding to the transfer-origin virtual address out of the real address bases 511 of the address translation table 500, registers the real address base that has been read out and the virtual address base of the above-mentioned transfer-source virtual address in the TLB 430 as a single TLB entry and indexes the TLB 430 again to perform the address translation (Sequence 5).

Since the TLB re-indexing after the TLB entry registration is carried out immediately after the necessary virtual address base is registered, a TLB hit is attained and address translation is completed.

Further, in a case where the TLB indexing in Sequence 4 is a TLB miss, the receiving device 420 of computer 2 in Sequence 5 reads a real address base corresponding to the virtual address out of the real address bases 511 of the address translation table 500, registers the real address base that has been read out and the virtual address base of the virtual address in the TLB 440 as a single TLB entry and indexes the TLB 440 again to perform the address translation. Since the TLB re-indexing is carried out immediately after the necessary virtual address base is registered, a TLB hit is attained and address translation is completed.

Next, the transmitting device 410 of computer 1 reads write data from the transfer-source real address of main memory 300 via the system controller 200 (Sequence 6).

Next, the transmitting device 410 of computer 1 generates a remote-write packet, which contains the transfer-destination virtual address set in Sequence 2 and the write data read out in Sequence 6, and transfers this packet to the receiving device 420 of computer 2 (Sequence 7).

Next, the receiving device 420 of computer 2 receives the remote-write packet transferred from the transmitting device 410 of computer 1 in Sequence 7, indexes the TLB 440 by the transfer-destination virtual address in this remote-write packet and translates the transfer-destination virtual address to a transfer-destination real address (Sequence 8).

In a case where the TLB indexing in Sequence 8 is a TLB miss, the receiving device 420 of computer 2 reads a real address base corresponding to the transfer-destination virtual address out of the real address bases 511 of the address translation table 500, registers the real address base that has been read out and the virtual address base of the transfer-source virtual address in the TLB 440 as a single TLB entry and indexes the TLB 440 again to perform the address translation. Since the TLB re-indexing is carried out immediately after the necessary virtual address base is registered, a TLB hit is attained and address translation is completed (Sequence 9).

The receiving device 420 of computer 2 writes the write data in the remote-write packet received in Sequence 7 to the transfer-destination real address of main memory 300 via the system controller 200 (Sequence 10).

It should be noted that commands and data are transferred in packet units between the transmitting device 410 of computer 1 and the receiving device 420 of computer 2.

The formats of packets transferred between the computers 1 and 2 will be described with reference to FIGS. 8a–8e.

In this embodiment, three packet formats are defined, namely the formats of the remote-read packet, remote-write packet and TLB pre-read packet.

FIG. 8a illustrates the packet format of the remote-write packet.

The remote-write packet includes an instruction item whose instruction is "Write" and whose data length is 4, which is the number of data items; a computer (host) item, which is the transmitting (originating) computer number and receiving (destination) computer number associated with this packet; an address item, which is a transmit-destination virtual address; and data items, which are four items of transfer data. The number of data items is substituted by the number of data items transferred. Four data items in this embodiment is one example.

FIG. 8b illustrates the packet format of the remote-read packet.

The remote-read packet includes an instruction item whose instruction is "Read" and whose data length is 1; a computer (host) item, which is the transmitting (originating) computer number and receiving (destination) computer number associated with this packet; an address item, which is a transmit-source virtual address; and a data item, which is a transfer-destination virtual address.

FIG. 8c illustrates the packet format of the TLB pre-read packet.

The TLB pre-read packet includes an instruction item whose instruction is TLB and whose data length is 0; a computer (host) item, which is the transmitting (originating) computer number and receiving (destination) computer number associated with this packet; and an address item, which is a virtual address. There are no data items.

FIG. 8d illustrates the operations performed by the instructions based upon each of the packets shown in FIGS. 8a to 8c.

The remote-write packet transfers the data of the computer that is the issuing source of the instruction to the destination computer.

The remote-read packet transfers the data of the destination computer to the computer that is the issuing source of the instruction.

The TLB pre-read packet instructs the receiving device of the destination computer to read the necessary information out of the address translation table 500 and register it in the TLB 440 when the TLB is indexed by a virtual address and a TLB miss occurs.

Next, reference will be had to FIG. 9 to describe the remote-read operation, which is for reading data out of another computer and writing the data to the local computer.

FIG. 9 is a diagram for describing the remote-read operation in a case where data is read out of computer 2 and written to computer 1.

First, the CPU 100 of computer 1 and the CPU 100 of computer 2 set the real address bases 511, which are necessary for the address translation of each process, in the address translation table 500 in each of computers 1 and 2 (Sequence 1).

Next, with respect to the transmitting device 410, the CPU 100 of computer 1 sets a remote-write instruction as the instruction code 801, transfer-source virtual address 415, transfer-destination virtual address 413, data-transfer length 414 and destination computer number 416 in instruction 800 within the transfer command processing unit 412 (Sequence 2).

Next, the transmitting device 410 of computer 1 generates a remote-read packet that includes the instruction code 801, destination computer number 416, transfer-source virtual address 415 and transfer-destination virtual address 413 within the instruction 800 that was in Sequence 2, and transfers this packet to the receiving device 420 of computer 2 via the switched network 600 (Sequence 3).

Next, the receiving device 420 of computer 2 receives the remote-read packet transferred from the transmitting device 410 of the computer 1 in Sequence 3 and generate a TLB pre-read packet which contains the transfer-destination virtual address as a destination virtual address to send the pre-read packet to the computer 1 which is the sender of the remote-read packet via the switched network 600 (Sequence 4).

Next, the receiving device 420 of computer 2 indexes the TLB 440 by the transfer-source virtual address within the remote-read packet received in Sequence 4 and translates the transfer-source virtual address to a transfer-source real address (Sequence 5).

Further, in Sequence 5, the receiving device 420 of computer 1 receives the TLB pre-read packet transferred from the receiving device 420 of computer 2 in Sequence 4, indexes the TLB 430 by the destination virtual address within the TLB pre-read packet and translates the virtual address to a real address.

In a case where the TLB indexing in Sequence 5 is a TLB miss, the receiving device 420 of computer 1 reads a real address base corresponding to the transfer-source virtual address out of the real address bases 511 of the address translation table 500, registers the real address base that has been read out and the virtual address base of the virtual address in the TLB 430 as a single TLB entry and indexes the TLB 430 again to perform the address translation (Sequence 6).

Since the TLB re-indexing is carried out immediately after the necessary virtual address base is registered, a TLB hit is attained and address translation is completed.

Further, in a case where the TLB indexing in Sequence 5 is a TLB miss, the receiving device 420 of computer 2 in Sequence 6 reads a real address base corresponding to the virtual address out of the real address bases 511 of the address translation table 500, registers the real address base that has been read out and the virtual address base of the transfer-source virtual address in the TLB 440 as a single TLB entry and indexes the TLB 440 again to perform the address translation. Since the TLB re-indexing is carried out immediately after the necessary virtual address base is registered, a TLB hit is attained and address translation is completed.

Next, via the system controller 200, the receiving device 420 of computer 2 reads transfer data from the transfer-source real address of main memory 300 after the above-mentioned address translation (Sequence 7).

Next, the transmitting device 420 of computer 2 generates a remote-write packet, which contains the transfer-destination virtual address within the remote-read packet received in Sequence 4 and the transfer data read out of the main memory 300 in Sequence 7, and transfers this packet to the computer 1, which is the transmission source of the remote-read packet (Sequence 8).

Next, the receiving device 420 of computer 1 receives the remote-write packet transferred from the receiving device 420 of computer 2 in Sequence 8, indexes the TLB 430 by the transfer-destination virtual address in this remote-write packet and translates the transfer-destination virtual address to a transfer-destination real address (Sequence 9).

In a case where the TLB indexing in Sequence 9 is a TLB miss, the receiving device 420 of computer 1 reads a real address base corresponding to the transfer-destination virtual address out of the real address bases 511 of the address translation table 500, registers the real address base that has been read out and the virtual address base of the transfer-source virtual address in the TLB 430 as one set of TLB entry and indexes the TLB 430 again to perform the address translation (Sequence 10). Since the TLB re-indexing is carried out immediately after the necessary virtual address base is registered, a TLB hit is attained and address translation is completed.

Thereafter, the receiving device 420 of computer 1 writes the data, which has been read out of the remote-write packet received in Sequence 8, to the address-translated transfer-destination real address of main memory 300 via the system controller 200 (Sequence 11).

Figure 10:
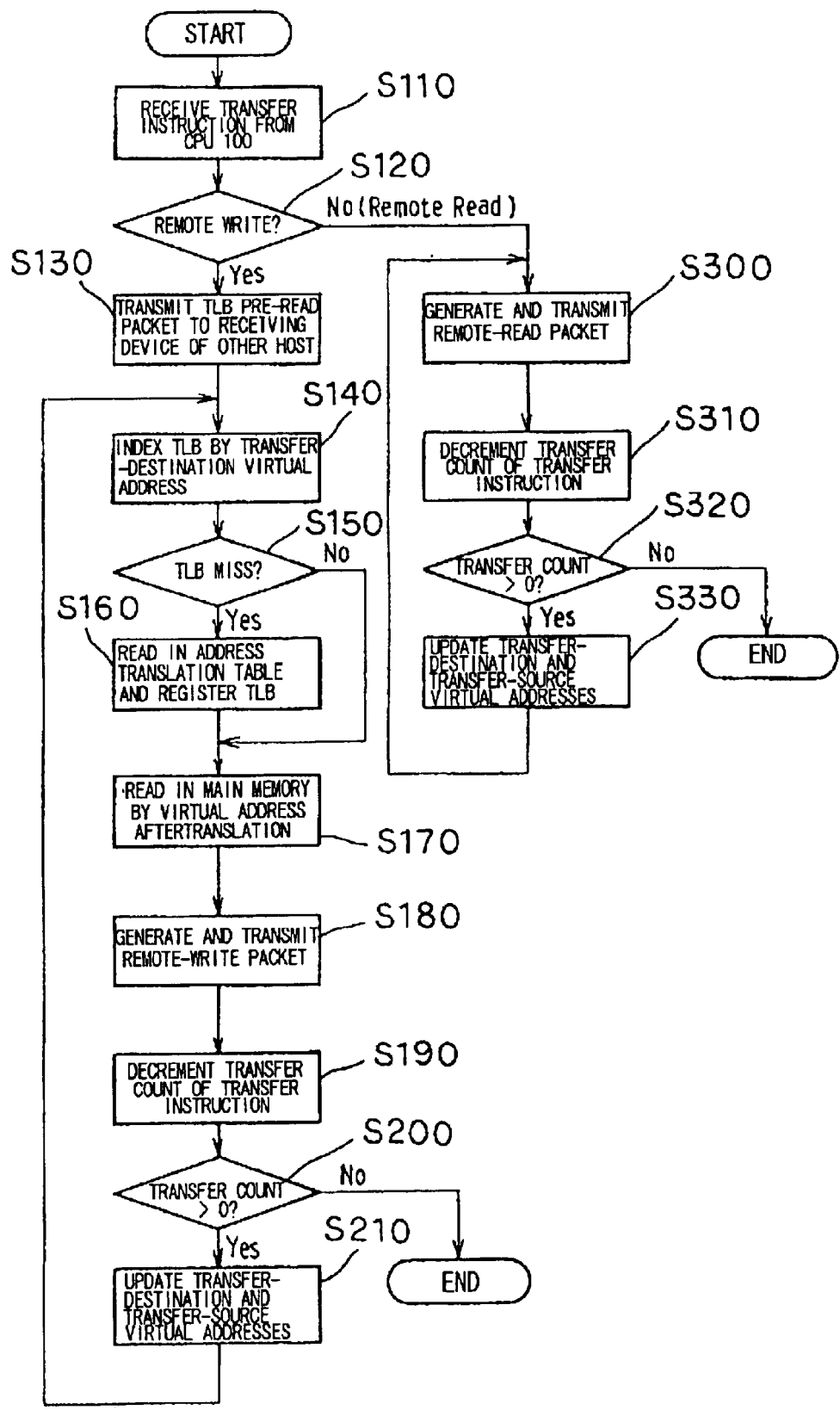
FIG. 10 is a flowchart for describing the operation of the transmitting device shown in FIG. 3.

The operation of the transmitting device 410 will now be described in detail with reference to the flowchart of FIG. 10.

First, the transfer command processing unit 412 accepts the transfer instruction 800 from the CPU 100 (step S110) and holds the transfer instruction 800 as the instruction code 801, transfer-destination virtual address (RV) 413, transfer count (LEN) 14, transfer-source virtual address (SV) 415 and destination computer number (DST) 416.

Next, it is determined whether the transfer instruction received by the transfer command processing unit 412 is a remote-write instruction (S120). If the instruction is a remote-write instruction, then the data output unit 417 generates a TLB pre-read packet, which contains the transfer-destination virtual address 413 and destination computer number 416 in the transfer command processing unit 412 and the transmitting computer number of its own computer, and transmits this packet to the switched network 600 (step S130). The TLB pre-read packet is transferred to the receiving device 420 in the other computer of destination computer number 416 by the switched network 600.

Next, the address comparator 433 indexes the TLB 430 by the transfer-source virtual address 415 in the transfer command processing unit 412 (step S140) and determines whether the indexing is a TLB miss (step S150). When the TLB indexing is performed, the address comparator 433 compares a virtual address base, which is part of the transfer-source virtual address 415, with the virtual address bases 431 of the TLB 430, determines that a TLB miss has occurred if the result of the comparison is a non-match with respect to all TLB entries, and determines that a TLB hit has occurred if the result of the comparison is that there is a TLB entry for which a match was obtained.

If a TLB miss is determined at step S150, then, as illustrated in FIG. 6, a real address base corresponding to transfer-source virtual address 415 is read out of the real address base 511 of address translation table 500, and the real address base read out and a virtual address base that is part of the transfer-source virtual address 415 are registered in the real address base 432 and virtual address base 431, respectively, as a single TLB entry (step S160). If the TLB 430 is re-indexed after the TLB entry registration, this will be immediately after the registration of the necessary virtual address base and therefore a TLB hit will be obtained.

If a TLB hit is determined at step S150 or step S160, then, as illustrated in FIG. 5, the data read-out unit 418 generates a transfer-source real address from the real address base, which matches the virtual address base of transfer-source virtual address 415, in the real address base of TLB 430, and an offset that is part of the transfer-source virtual address 415, reads out transfer data from the above-mentioned transfer-source real address of main memory 300 via the system controller 200 and registers this transfer data in the data buffer 411 (step S170).

Next, the data output unit 417 generates a remote-write packet that contains the transfer data in the data buffer 411, the transfer-destination virtual address 413 and destination computer number 416 in the transfer command processing unit 412 and the transmitting computer number of the local computer, and transmits this packet to the switched network 600 (step S180). This remote-write packet is transferred to the receiving device 420 of the other computer of destination computer number 416 via the switched network 600.

When the transfer at step S180 is finished, the transfer command processing unit 412 decrements the transfer count 414 by one to update the transfer count 414 (step S190) and determines whether the updated transfer count 414 is greater than zero (step S200).

If it is found at step S200 that the transfer count 414 is zero, the transfer instruction is terminated. If the transfer count 414 is greater than zero, i.e., if the transfer instruction is to continue, then the transfer-destination virtual address 413 and transfer-source virtual address 415 are updated by adding on the data length of one packet (step S210), after which control returns to the processing of step S140. For example, if the data length of one packet is 16 bytes, then a new virtual address is calculated according to the following formula:

a new virtual address=old virtual address+16.

On the other hand, if it is found at step S120 that the transfer instruction received by the transfer command processing unit 412 is a remote-read instruction and not a remote-write instruction, then the data output unit 417 generates a remote-read packet that contains the transfer-destination virtual address 413, transfer-source virtual address 415 and destination computer number 416 in the transfer command processing unit 412 as well as the transmitting computer number of its own computer, and transmits this packet to the switched network 600 (step S300). This remote-read packet is transferred by the switched network 600 to the receiving device 420 of the other computer having the destination host number 416.

When the transfer at step S300 is finished, the transfer command processing unit 412 decrements the transfer count 414 by one to update the transfer count 414 (step S310) and determines whether the updated transfer count 414 is greater than zero (step S320).

If it is found at step S320 that the transfer count 414 is zero, the transfer instruction is terminated. If the transfer count 414 is greater than zero, i.e., if the transfer instruction is to continue, then the transfer-destination virtual address 413 and transfer-source virtual address 415 are updated by adding on the data length of one packet (step S330), after which control returns to the processing of step S300. For example, if the data length of one packet is 16 bytes, then a new virtual address is calculated according to the following formula:

a new virtual address=old virtual address+16.

Figure 11:
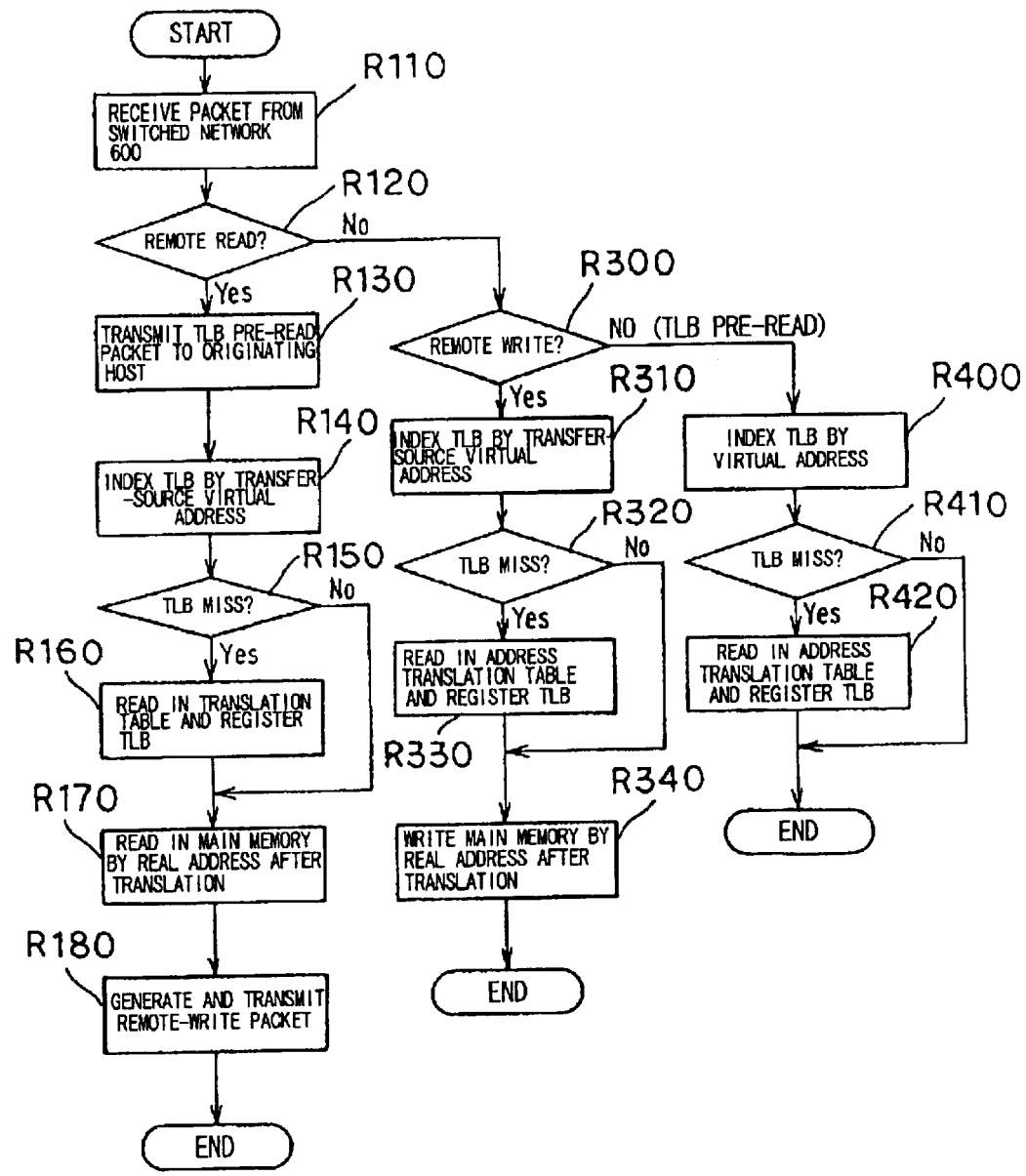
FIG. 11 is a flowchart for describing the operation of the receiving device shown in FIG. 4.

The operation of the receiving device 420 will be described in detail with reference to the flowchart of FIG. 11.

First, the transfer designating processor 422 receives a packet from the switched network 600 (step R110).

Next, it is determined whether the packet received by the command address buffer 422 is a remote-read packet (step R120). If the packet is a remote-read packet, then the switched-network output unit 425 generates a TLB pre-read packet that contains the transmitting-source computer number and transfer-destination virtual address in this remote-read packet as the destination computer number and virtual address, respectively, and transmits this packet to the switched network 600 (step R120). The TLB pre-read packet is transferred by the switched network 600 to the receiving device 420 in the other computer of the destination computer number.

Next, the address comparator 443 indexes the TLB 440 by the transfer-source virtual address within the remote-read packet (step R140) and determines whether the index is a TLB miss (step R150). When TLB indexing is performed, the address comparator 433 compares a virtual address base, which is part of the transfer-source virtual address within the remote-read packet, with the virtual address bases 441 of the TLB 440, determines that a TLB miss has occurred if the result of the comparison is a non-match with respect to all TLB entries, and determines that a TLB hit has occurred if the result of the comparison is that there is a TLB entry for which a match was obtained.

If a TLB miss is determined at step R150, then, as illustrated in FIG. 6, a real address base corresponding to transfer-source virtual address within the remote-read packet is read out of the real address base 511 of address translation table 500, and the real address base read out and a virtual address base that is part of the transfer-source virtual address corresponding to the transfer-source virtual address within the remote-read packet are registered in the real address base 442 and virtual address base 441, respectively, as a single TLB entry (step R160). If the TLB 430 is re-indexed after the TLB entry registration, this will be immediately after the registration of the necessary virtual address base and therefore a TLB hit will be obtained.

If a TLB hit is determined at step R150 or step R160, then, as illustrated in FIG. 5, the memory access unit 423 generates a transfer-source real address from the real address base, which matches the virtual address base of the transfer-source virtual address within the remote-read packet, in the real address base of TLB 440, and an offset that is part of the transfer-source virtual address within the remote-read packet, and reads out transfer data from the above-mentioned transfer-source real address of main memory 300 via the system controller 200 (step R170).

Next, the switched-network output unit 425 generates a remote-write packet that contains the transfer data read out of the main memory 300, the destination computer number (the transmitting computer number in the remote-read packet) and the transfer-destination virtual address within the remote-read packet, and transmits this packet to the switched network 600 (step R180). This remote-write packet is transferred to the receiving device 420 within the other computer of destination computer number by the switched network 600.

The foregoing completes the processing of the remote-read packet.

On the other hand, if it is found at step R120 that the packet received by the command address buffer 422 is other than the remote-read packet, then it is determined whether this packet is a remote-write packet (step R300).

If it is determined at step R300 that the packet received by the command address buffer 422 is a remote-write packet, then the address comparator 443 indexes the TLB 440 by the transfer-destination virtual address within the remote-write packet (step R310) and determines whether the index is a TLB miss (step R320). When TLB indexing is performed, the address comparator 443 compares a virtual address base, which is part of the transfer-destination virtual address within the remote-write packet, with the virtual address bases 441 of the TLB 440, determines that a TLB miss has occurred if the result of the comparison is a non-match with respect to all TLB entries, and determines that a TLB hit has occurred if the result of the comparison is that there is a TLB entry for which a match was obtained.

If a TLB miss is determined at step R320, then, as illustrated in FIG. 6, a real address base corresponding to the transfer-destination virtual address within the remote-write packet is read out of the real address base 511 of address translation table 500, and the real address base read out and a virtual address base that is part of the transfer-destination virtual address within the remote-write packet are registered in the real address base 442 and virtual address base 441, respectively, as a single TLB entry (step R330). If the TLB 440 is re-indexed, this will be immediately after the registration of the necessary virtual address base and therefore a TLB hit will be obtained.

If a TLB hit is determined at step R320 or step R330, then, as shown in FIG. 5, the memory access unit 423 generates a transfer-destination real address from the real address base, which matches the virtual address base of the transfer-destination virtual address within the remote-write packet, in the real address base 442 of TLB 440, and an offset that is part of the transfer-destination virtual address within the remote-write packet, transfers the transfer data in the data buffer 421 to the memory access unit 423 at the above-mentioned transfer-destination real address of main memory 300 via the system controller 200, and the memory access unit 423 writes this transfer data to the main memory 300 via the system controller 200 (step R340).

The foregoing completes the processing of the remote-write packet.

On the other hand, if it is found at step R300 that the packet received by the command address buffer 422 is a TLB pre-read packet and not a remote-write packet, then the address comparator 443 indexes the TLB 440 by the virtual address within the TLB pre-read packet (step R400) and determines whether the index is a TLB miss (step R410). When TLB indexing is performed, the address comparator 443 compares a virtual address base of the virtual address within the TLB pre-read packet with the virtual address bases 441 of the TLB 440, determines that a TLB miss has occurred if the result of the comparison is a non-match with respect to all TLB entries, and determines that a TLB hit has occurred if the result of the comparison is that there is a TLB entry for which a match was obtained.

If a TLB miss is determined at step R410, then, as illustrated in FIG. 6, a real address base corresponding to the virtual address within the TLB pre-read packet is read out of the real address base 511 of address translation table 500, and the real address base read out and a virtual address base that is part of the virtual address within the TLB pre-read packet are registered in the real address base 442 and virtual address base 441, respectively, as a single TLB entry (step R420).

The foregoing completes the processing of the TLB pre-read packet.

[Second Embodiment]

The first embodiment described above is such that after a remote-write command is received from the CPU 100, the transmitting device 410 transmits a TLB pre-read packet only at the start of data transmission. The receiving device 420 transmits the TLB pre-read packet with respect to all remote-read packets.

However, in a case where an address translation is performed per predetermined size of the main-memory space referred to as a "page" with the arrangement in which the TLB pre-read packet is transmitted only at the start of data transmission, the possibility that a TLB miss will occur is high when a virtual address base changes during data transmission, i.e., when the page boundary is exceeded. A problem which arises, therefore, is a decline in data transmission speed when a page boundary is exceeded.

Further, with the arrangement in which a TLB pre-read packet is transmitted with respect to all remote-read packets, a problem which arises is waste of switched-network bandwidth and a meaningless increase in the TLB indexing frequency.

In order to solve these two problems, the second embodiment is such that the transmitting device 410 transmits a TLB pre-read packet at the start of data transmission and when the virtual address at the data transfer destination causes a page to be exceeded. The receiving device 420 transmits the TLB pre-read packet with respect to a remote-read packet only when the virtual address at the data transfer destination causes a page to be exceeded. This solves the problems of a decline in performance when a page boundary is exceeded, waste of switched-network bandwidth and an increase in TLB indexing frequency.

Figure 12:
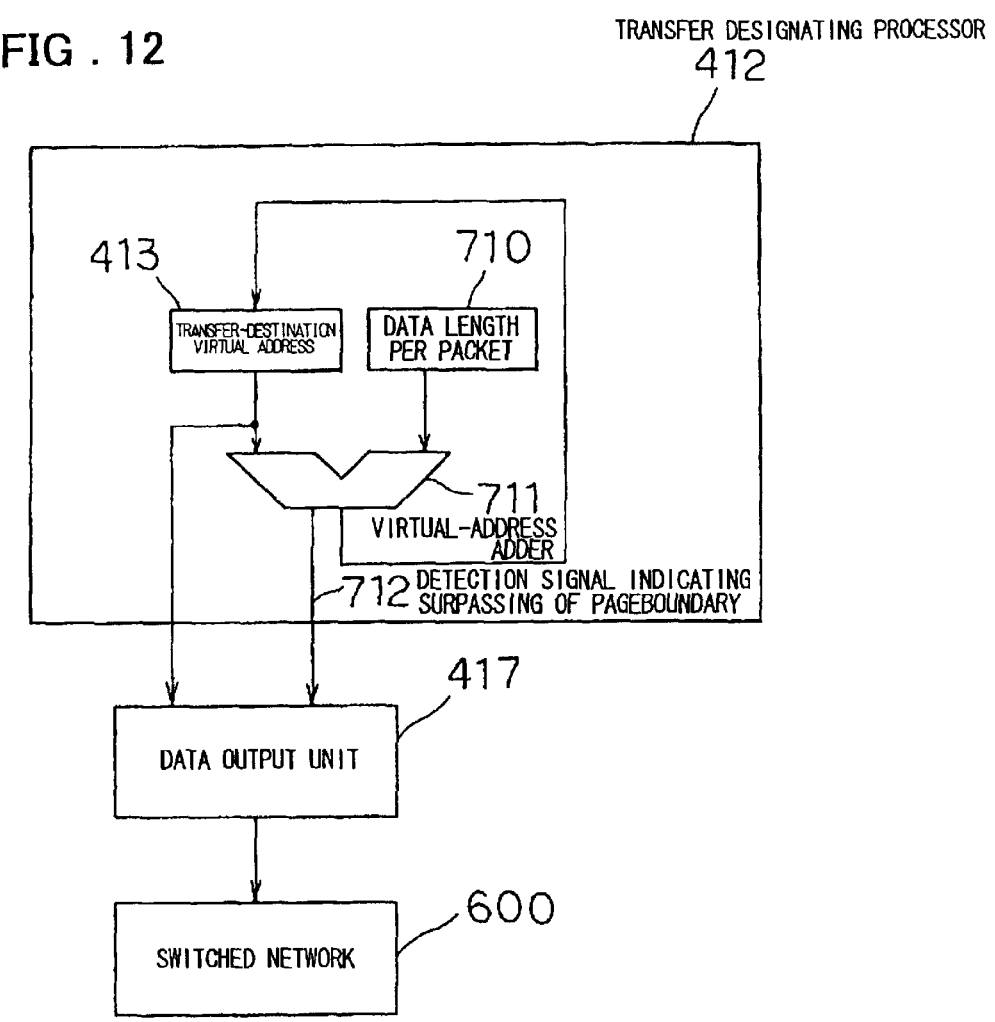
FIG. 12 is a diagram useful in describing a transfer processing unit in a transmitting device used in a second embodiment of a system for transferring data between virtual addresses according to the present invention.

In order to clarify the difference between this embodiment and the first embodiment, FIG. 12 illustrates only the portion of the transfer command processing unit 412 for calculating a transfer-destination virtual address in the transmitting device 410.

The transfer command processing unit 412 in the first embodiment adds the transfer-destination virtual address 413 and a data length 710 per packet, which is the data length of one packet, using a virtual-address adder 711, and adopts the output of the adder 711 as the transfer-destination virtual address 413.

By contrast, the transfer command processing unit 412 in the second embodiment adopts the output of the virtual-address adder 711 as the transfer-destination virtual address 413 and inputs this to the data output unit 417 as a detection signal 712 indicating that the page boundary has been exceeded.

In other words, if the transfer-destination virtual address 413 causes the page boundary to be exceeded, a TLB pre-read request based upon the updated transfer-destination virtual address 413 is transmitted to the data output unit 417 as the detection signal 712 indicating that the page boundary has been exceeded.

By virtue of the page-boundary detection function, the data output unit 417 transmits the TLB pre-read packet to the destination computer via the switched network 600 at the initial transmission of the remote-write packet in the remote-write instruction or in a case where the TLB pre-read request from the transfer command processing unit 412 has been received.

Further, in a case where the data output unit 417 has received a TLB pre-read request from the transfer command processing unit 412 during transmission of the remote-read packet, the data output unit 417 transmits a remote-read packet in which a TLB pre-read request flag has been set. If the data output unit 417 has not received the TLB pre-read request during transmission of the remote-read packet, then the data output unit 417 transmits a remote-read packet in which a TLB pre-read request flag has not been set.

A remote-read packet with a TLB pre-read request flag is shown in FIG. 8e.

In FIG. 8e, a TLB pre-read request flag PF has been added to the instruction item. Upon receiving a remote-read packet for which PF=1 holds, the receiving device 420 transmits the TLB pre-read packet to the transmitting source of the remote-read packet. Upon receiving a remote-read packet for which PF=0 holds, the receiving device 420 does not transmit the TLB pre-read packet.

Figure 13:
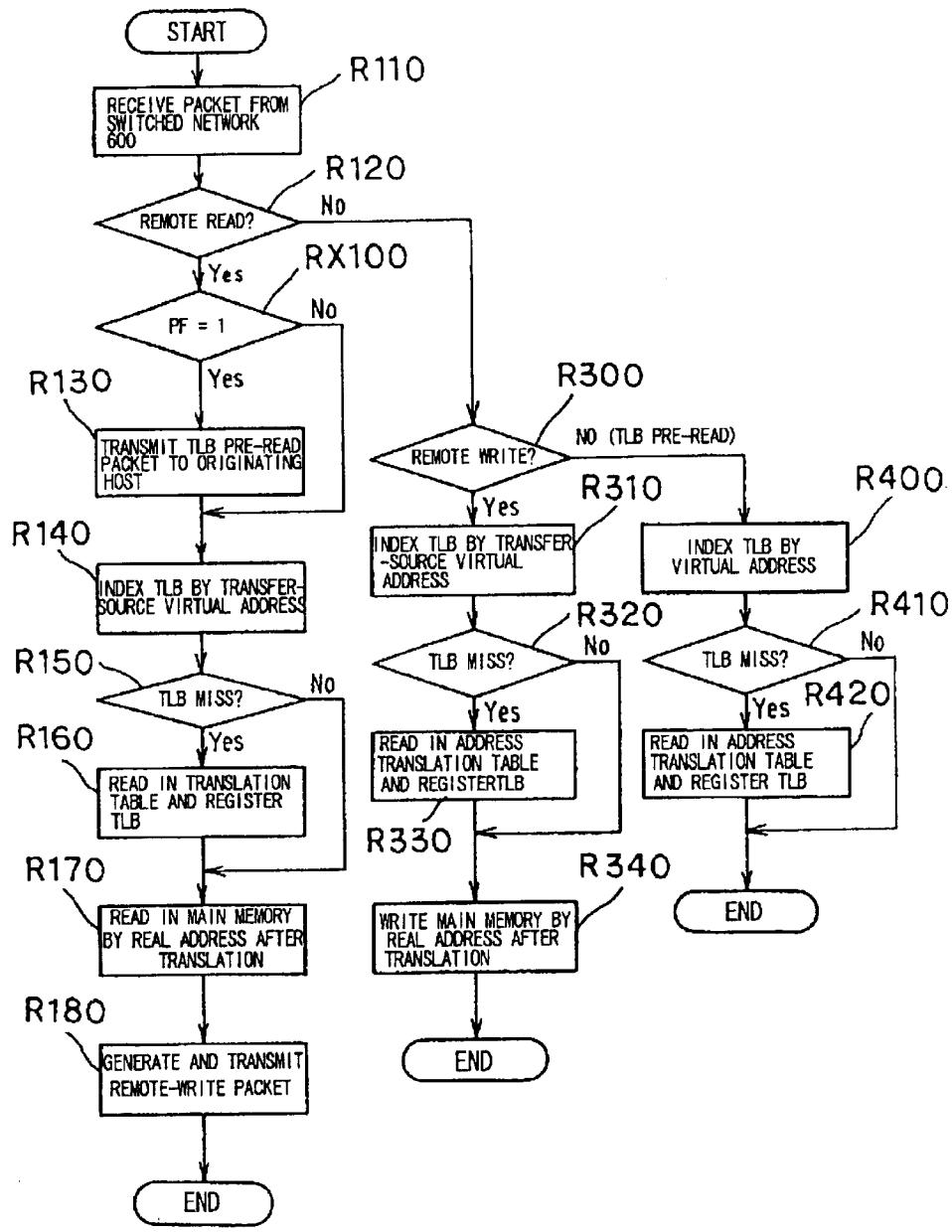
FIG. 13 is a flowchart for describing the operation of a receiving device used in the second embodiment of the system for transferring data between virtual addresses according to the present invention.

FIG. 13 is a flowchart illustrating how the operation of the receiving device 420 according to the second embodiment differs from that of the first embodiment. In FIG. 13, step numbers preceded by an "R" indicate steps according to the first embodiment, while a step preceded by "RX" indicates a step according to the second embodiment.

The operation of the receiving device 420 according to the second embodiment will be described with reference to the receiving device 420.

If the receiving device 420 receives a remote-read packet ("YES" at step R120), the TLB pre-read request flag PF is checked at step RX100 and control proceeds to step R130 is PF=1 holds. If PF=0 is found to hold at step RX100, then control proceeds to step R140.

The meritorious effects of the present invention are summarized as follows.

The present invention as described above exhibits a number of important effects.

Specifically, the arrangement is such that if data is transferred between computers, a receiving device within the computer at the destination of the data transmission is instructed to pre-register translation information, which corresponds to the virtual address of the data transfer destination, in a TLB at the same time that data is read out of a main memory within the computer at the source of the data transmission. By performing the read-out of data from the main memory in the computer at the source of the data transmission in concurrence with the read-out of virtual-address translation information from an address translation table in the computer at the destination of the data transmission to the TLB, the apparent address translation time is shortened in comparison with the conventional method of reading out the address translation information and registering it in the TLB after data has been received by the computer that is the destination of the data transmission. This is a first effect of the present invention.

Furthermore, some or all of TLB read-out time in the computer that is the destination of the data transmission is hidden by the data read-out time of the computer that is the source of the data transmission. In the computer that is the destination of the data transmission, therefore, the time that data waits for read-out of the address translation table is shortened in a data buffer that is for temporarily holding the received data. As a result, it is possible to reduce the capacity of a data standby buffer within the computer that is the destination of the data transmission. The amount of hardware used can be reduced. This is a second effect of the present invention.

Further, even in a case where the receiving device in the computer that is the source of the data transmission transmits data to the receiving device in the computer that is the destination of the data transmission in accordance with a command from the transmitting device in the destination computer, the receiving device in the destination computer is instructed to pre-register translation information, which corresponds to the virtual address of the data-transfer destination, in a TLB at the same time that data is read out of a main memory in the source computer. A third effect of the present invention is that effects similar to those described above are obtained.

Further, in a case where the transmitting device in the computer that is the source of a data transmission transmits data to the receiving device in the computer that is the destination of the data transmission, the receiving device in the computer at the destination is instructed to pre-register translation information in a TLB at the start of the data transmission. Furthermore, the receiving device is instructed to pre-register translation information in the TLB even when a virtual address of the main memory in the destination computer has exceeded a page boundary. As a result, it is possible to reduce the likelihood that translation information of a required virtual address will not have been registered in the TLB at the start of data transmission or when a page boundary is exceeded. In other words, it is possible to reduce the possibility that performance will decline owing to the occurrence of TLB misses. This is a fourth effect of the present invention.

Further, even in a case where the receiving device in the computer that is the source of the data transmission transmits data to the receiving device in the computer that is the destination of the data transmission in accordance with a command from the transmitting device in the destination computer, the receiving device is instructed to pre-register translation information in the TLB only when the virtual address of the main memory in the destination computer causes a page boundary to be exceeded. As a result, an excessive increase in TLB indexing frequency can be suppressed and switched-network bandwidth can be reduced. This is a fifth effect of the present invention.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A system for transferring data between virtual addresses, said system comprising a plurality of computers each equipped with a central processing unit; a main memory for storing data; an address translation table holding address information for translating a virtual address to a real address; a transmitting device for reading out, and transmitting to a switched network interconnecting said plurality of computers, data from said main memory, said transmitting device incorporating a transmitting device translation look-aside buffer holding a portion of the translation information of said address translation table; and a receiving device for receiving, and writing to said main memory, data from the switched network, said receiving device incorporating a receiving device translation look-aside buffer holding a portion of the translation information of said address translation table;

the data in said main memories being transferred between said plurality of computers via the switched network upon designating addresses of a data-transfer source and data-transfer destination by the virtual addresses;

translation information associated with the virtual addresses of the data-transfer source and data-transfer destination being registered in the translation look-aside buffers from said address translation table internally of said transmitting and receiving devices within said computers; and an address translation from the virtual addresses to the real addresses being performed using the translation information registered in the translation look-aside buffers; wherein if data in said main memory of one of said computers equipped with said transmitting device is transmitted to said receiving device within another one of said computers, said transmitting device, in concurrence with read-out of data from said main memory provided within the computer equipped with said transmitting device, instructs said receiving device provided within said another computer to pre-register the translation information corresponding to the virtual address of the data-transfer destination in the receiving device translation look-aside buffer provided within said another computer.

2. The system according to claim 1, wherein if said receiving device receives a remote-read instruction, which is issued from the transmitting device provided within a computer constituting a requesting source, for transferring data from said main memory provided within the computer equipped with said receiving device, said receiving device, in concurrence with read-out of data from said main memory provided within the computer equipped said receiving device, instructs said receiving device provided within the computer constituting the requesting source to pre-register the translation information corresponding to the virtual address of the destination-transfer destination in the receiving device translation look-aside buffer provided within the computer constituting the requesting source.

3. The system according to claim 2, wherein said transmitting device and said receiving device perform the address translation on a per-page basis, where a page is the size of a predetermined memory space in said main memory.

4. The system according to claim 3, wherein if data in said main memory of one of said computers equipped with said transmitting device is transmitted to said receiving device within another one of said computers, said transmitting device instructs said receiving device provided within said another computer to pre-register the translation information in the receiving device translation look-aside buffer when data transmission starts and instructs said receiving device provided within said another computer to pre-register the translation information in the receiving device translation look-aside buffer when a virtual address in said main memory within said other computer causes a page boundary to be exceeded.

5. The system according to claim 4, wherein when said transmitting device transmits a transfer request to another computer in order for data in said main memory provided within said another computer to be transferred to the main memory provided within the computer equipped with said transmitting device serving as a transfer destination, said transmitting device sends said receiving device provided in said another computer a transfer request, obtained by attaching a flag designating pre-registration of address conversion information to a packet, if a virtual address of the transfer destination that constitutes a transfer requesting source causes a page boundary to be exceeded, and said receiving device in said other computer transmits a packet, which instructs said receiving device in the computer that sent the transfer request to pre-register the translation information in the receiving device translation look-aside buffer, only if the flag designating pre-registration has been attached to the packet.

6. The system according to claim 2, wherein when said receiving device instructs that the translation information is to be pre-registered in the receiving device translation look-aside buffer, said receiving device transmits a TLB pre-read packet containing the virtual address of a data-transfer destination.

7. The system according to claim 1, wherein when said transmitting device instructs that the translation information is to be pre-registered in the transmitting device translation look-aside buffer, said transmitting device transmits a TLB pre-read packet containing the virtual address of a data-transfer destination.

8. The system according to claim 1, wherein said transmitting device provided within said one computer is adapted to generate a TLB pre-read packet including at least a transfer-destination virtual address, on receipt of a remote-write instruction issued by the central processing unit provided within said one computer, said remote-write instruction requesting said transmitting device provided within said one computer to execute data transfer from said transmitting device provided within said one computer to said receiving device provided within said another computer to transmit the generated TLB pre-read packet to the receiving device provided within said another computer, thereby requesting the receiving device provided within said another computer to perform a pre-read operation of the receiving device transfer look-aside buffer provided within said another computer, and said transmitting device provided within said one computer translates a transfer-source virtual address to a transfer-source real address by using the transmitting device transfer look-aside buffer provided within said one computer, while said receiving device provided within said another computer, on receipt of the TLB pre-read packet transferred from said transmitting device, performs indexing of the receiving device transfer look-aside buffer provided within said another computer by the transfer-destination virtual address contained in the TLB pre-read packet received to translate the virtual address to a real address.

9. The system according to claim 8, wherein said transmitting device provided within said one computer, after executing an address translation from the transfer-source virtual address to the transfer-source real address, reads data from the transfer-source real address of the main memory to generate a remote-write packet including a transfer-destination virtual address and data read out from said main memory for transferring said remote-write packet to said receiving device provided within said another computer, and said receiving device provided within said another computer, on receipt of the remote-write packet transferred from said transmitting device provided within said one computer, performs an address translation of a transfer-destination virtual address to a transfer-destination real address by using indexing of the receiving device transfer look-aside buffer by the transfer-destination virtual address contained in the remote-write packet to translates the transfer-destination virtual address to a transfer-destination real address.

10. The system according to claim 1, wherein said transmitting device is adapted to generate a remote-read packet including at least a transfer-source virtual address and a transfer-destination virtual address, on receipt of a remote-read instruction issued by the central processing unit provided within said one computer, said remote-read instruction requesting a data transfer from said receiving device provided within said another computer to said receiving device provided within said one computer to transmit the generated remote-read packet to the receiving device provided within said another computer, said receiving device within said another computer, is adapted so that said receiving device, on receipt of the remote-read packet transferred from said transmitting device provided within said one computer, generates a TLB pre-read packet including at least a transfer-destination virtual address to send the generated TLB pre-read packet to the receiving device provided within said one computer, and said receiving device provided within said another computer performs an address translation from a transfer-source virtual address to a transfer-source real address by using the receiving device transfer look-aside buffer provided within said another computer, while said receiving device provided within said one computer, on receipt of the TLB pre-read packet transferred from said receiving device provided within said another computer, performs indexing of the receiving device transfer look-aside buffer provided within said one computer by the transfer-destination virtual address contained in the TLB pre-read packet received to translate the virtual address to a real address.

11. The system according to claim 10, wherein said receiving device provided within said another computer, after executing an address translation from the transfer-source virtual address to the transfer-source real address, reads data from the transfer-source real address of the main memory provided within said another computer to generate a remote-write packet including at least a transfer-destination virtual address contained in the remote-read packet received and data read out from said main memory provided within said another computer for transferring said remote-write packet to said receiving device provided within said one computer, and said receiving device provided within said one computer, on receipt of the remote-write packet transferred from said transmitting device provided within said another computer, performs an address translation from a transfer-destination virtual address to a transfer-destination real address by using indexing of the receiving device transfer look-aside buffer by the transfer-destination virtual address contained in the remote-write packet received to translates the transfer-destination virtual address to a transfer-destination real address.

* * * * *